United States Patent
Endo

(12) United States Patent (10) Patent No.: US 6,999,844 B2
(45) Date of Patent: Feb. 14, 2006

(54) NUMERICAL CONTROLLER

(75) Inventor: Takahiko Endo, Kokubunji (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/662,300

(22) Filed: Sep. 16, 2003

(65) Prior Publication Data

US 2004/0059460 A1  Mar. 25, 2004

(30) Foreign Application Priority Data

Sep. 24, 2002 (JP) ............................. 2002-277182

(51) Int. Cl.
*G05B 19/18* (2006.01)

(52) U.S. Cl. ......................... 700/188; 700/159; 451/5; 493/2

(58) Field of Classification Search ................. 700/117, 700/159, 186, 188; 269/55, 71; 451/1, 5, 451/11; 493/2
See application file for complete search history.

(56) References Cited

U.S. PATENT DOCUMENTS

| | | | |
|---|---|---|---|
| 4,262,454 A * | 4/1981 | Iida et al. ..................... 451/228 |
| 4,862,381 A * | 8/1989 | Shibata ......................... 700/194 |
| 4,928,437 A * | 5/1990 | Waelti ............................. 451/5 |
| 4,970,449 A * | 11/1990 | Kawamura et al. .......... 318/569 |
| 4,990,840 A * | 2/1991 | Migda .......................... 318/571 |
| 5,079,490 A * | 1/1992 | Kita et al. .................... 318/569 |
| 5,610,489 A * | 3/1997 | Hart et al. ................... 318/571 |
| 5,654,894 A * | 8/1997 | Tsutsui ........................ 700/188 |
| 2002/0193906 A1 * | 12/2002 | Sugiyama et al. ........... 700/188 |
| 2003/0014151 A1 * | 1/2003 | Nigazawa et al. .......... 700/186 |

FOREIGN PATENT DOCUMENTS

| | | |
|---|---|---|
| JP | 06-15547 | 1/1994 |
| JP | 07-271422 | 10/1995 |
| JP | 09-251311 | 9/1997 |
| JP | 10-118888 | 5/1998 |

OTHER PUBLICATIONS

Notification of Grounds for Rejection for corresponding Japanese Application No. 2002-277182 mailed Dec. 7, 2004.

* cited by examiner

Primary Examiner—Jayprakash N. Gandhi
(74) Attorney, Agent, or Firm—Staas & Halsey LLP

(57) ABSTRACT

A numerical controller for performing an machining operation by controlling relative position of a workpiece and a tool in synchronism with a rotational position of a rotational axis to which the workpiece or the tool is attached, without causing time delay of position control of the tool relative to the workpiece in varying a rotational velocity of the rotational axis. A rotational position $\theta_i(i=0, 1, \ldots)$ of a workpiece on the rotational axis, a position $(X_i, Z_i)$ of the tool relative to the workpiece when the workpiece is at the rotational position $\theta_i$, and the rotational velocity $V_i$ of the workpiece from the rotational position $\theta_i$ to the rotational position $\theta_{i+1}$ are set in advance. Time $T_i$ required for rotating the workpiece from the rotational position $\theta_i$ to the rotational position $\theta_{i+1}$ at the rotational velocity $V_i$ is obtained. Velocities $Vx_i$ and $Vz_i$ of the workpiece are obtained so that the position of the workpiece reaches the next set position $(X_{i+1}, Z_{i+1})$ in the time $T_i$. Servomotors for the spindle, the X-axis and the Z-axis are driven at the set velocity or the calculated velocities to provide relative motions to the workpiece and the tool for the machining operation.

16 Claims, 3 Drawing Sheets

| i | ROTATIONAL POSITION (360*n+α) | ROTATIONAL VELOCITY Vi | POSITION Xi OF TOOL | POSITION Zi OF TOOL | X-AXIS VELOCITY Vx | Z-AXIS VELOCITY Vz |
|---|---|---|---|---|---|---|
| 0 | θ0 | V0 | X0 | Z0 | Vx0 | Vz0 |
| 1 | θ1 | V1 | X1 | Z1 | Vx1 | Vz1 |
| 2 | θ2 | V2 | X2 | Z2 | Vx2 | Vz2 |
| 3 | θ3 | V3 | X3 | Z3 | Vx3 | Vz3 |
| 4 | θ4 | V4 | X4 | Z4 | Vx4 | Vz4 |
| 5 | θ5 | — | X5 | Z5 | — | — |

NUMERICAL CONTROLLER

BACKGROUND OF THE INVENTION

1. Field of the Invention

The present invention relates to a numerical controller, and in particular to a numerical controller for controlling relative motions of a tool and a workpiece so that one of the tool and the workpiece is synchronized with a rotating motion of the other.

2. Description of Related Art

There is conventionally known a machine in which one axis of the machine is operated in synchronism with rotation of a cam on another axis so that the motion of the one axis is controlled in accordance with a shape of the cam, as an automatic lathe with a mechanical cam. There have been proposed various devices for performing an operation equivalent to the synchronized operation by the mechanical cam without using the mechanical cam. In these devices, it is common to control positions of axes for a tool in synchronism with a rotational position of a workpiece using ordinary NC data. In these devices, however, since slave axes such as axes for the tool are controlled on the basis of a rotational position of a master axis such as a spindle axis using to a feedback signal of the rotational position of the master axis, it is inevitable that the position controls of the slave axes are delayed with respect to a rotational position of the slave axis especially in variation of rotational velocity of the master axis.

There have been also proposed a device on the basis of time in which time required for moving each axis by a unit amount is controlled so as to control relative positions of the workpiece and the tool, such as disclosed in JP 6-15547A, and a device on the basis of the number of reference pulses in which the respective axes of the workpiece and the tool are controlled to be positioned to be corresponding to the number of reference pulses, such as disclosed in JP 7-271422A. There are difficulties in practicing these methods as described in these publications using the general numerical controllers.

SUMMARY OF THE INVENTION

The present invention provides a numerical controller capable of controlling relative position of a workpiece and a tool in synchronism with a reference rotational axis, to which the workpiece or the tool is attached, without causing time delay of the position control of the tool especially in variation of a rotational velocity of the reference axis.

According to one aspect of the present invention, a numerical controller controls a machining operation on a workpiece by a tool by rotating the workpiece and moving the tool relatively to the workpiece, and the numerical controller comprises: designating means to designate data of a rotational position and a rotational velocity of the workpiece, and data of a position of the tool relative to the workpiece corresponding to the data of the rotational position of the workpiece; and computing means for controlling the rotational position and the rotational velocity of the workpiece and the position of the tool relative to the workpiece based on the data designated by said designating means.

The computing means may obtain a velocity of motion of the tool relative to the workpiece based on the data of the rotational position and the rotational velocity of the workpiece and the data of the position of the tool relative to the workpiece, and control the position of the tool relative to the workpiece based on the obtained velocity motion of the tool.

The numerical controller may further comprise data input means for inputting the data of the rotational position and rotational velocity of the workpiece, and the data of the position of the tool relative to the workpiece corresponding to the data of the rotational position of the workpiece, and may further comprise storage means for storing the these data. The computing means may create NC data based on the data stored in the storage means.

According to another aspect of the present invention, a numerical controller controls a machining operation on a workpiece by a tool by rotating the tool and moving the tool relatively to the workpiece, and the numerical controller comprises: designating means to designate data of a rotational position and a rotational velocity of the workpiece, and data of a position of the tool relative to the workpiece corresponding to the data of the rotational position of the workpiece; and computing means for controlling the rotational position and the rotational velocity of the tool and the position of the tool relative to the workpiece based on the data designated by said designating means.

In this case, the computing means may obtain a velocity of motion of the tool relative to the workpiece based on the data of the rotational position and the rotational velocity of the tool and the data of the position of the tool relative to the workpiece, and control the position of the tool relative to the workpiece based on the obtained velocity of motion of the tool. The numerical controller may further comprise data input means for inputting the data of the rotational velocity and the rotational position of the tool, and the data of the position of the tool relative to the workpiece corresponding to the data of the rotational position of the tool, and may further comprise storage means for storing the these data. The computing means may create NC data based on the data stored in the storage means.

DETAILED DESCRIPTION

Figure 1:
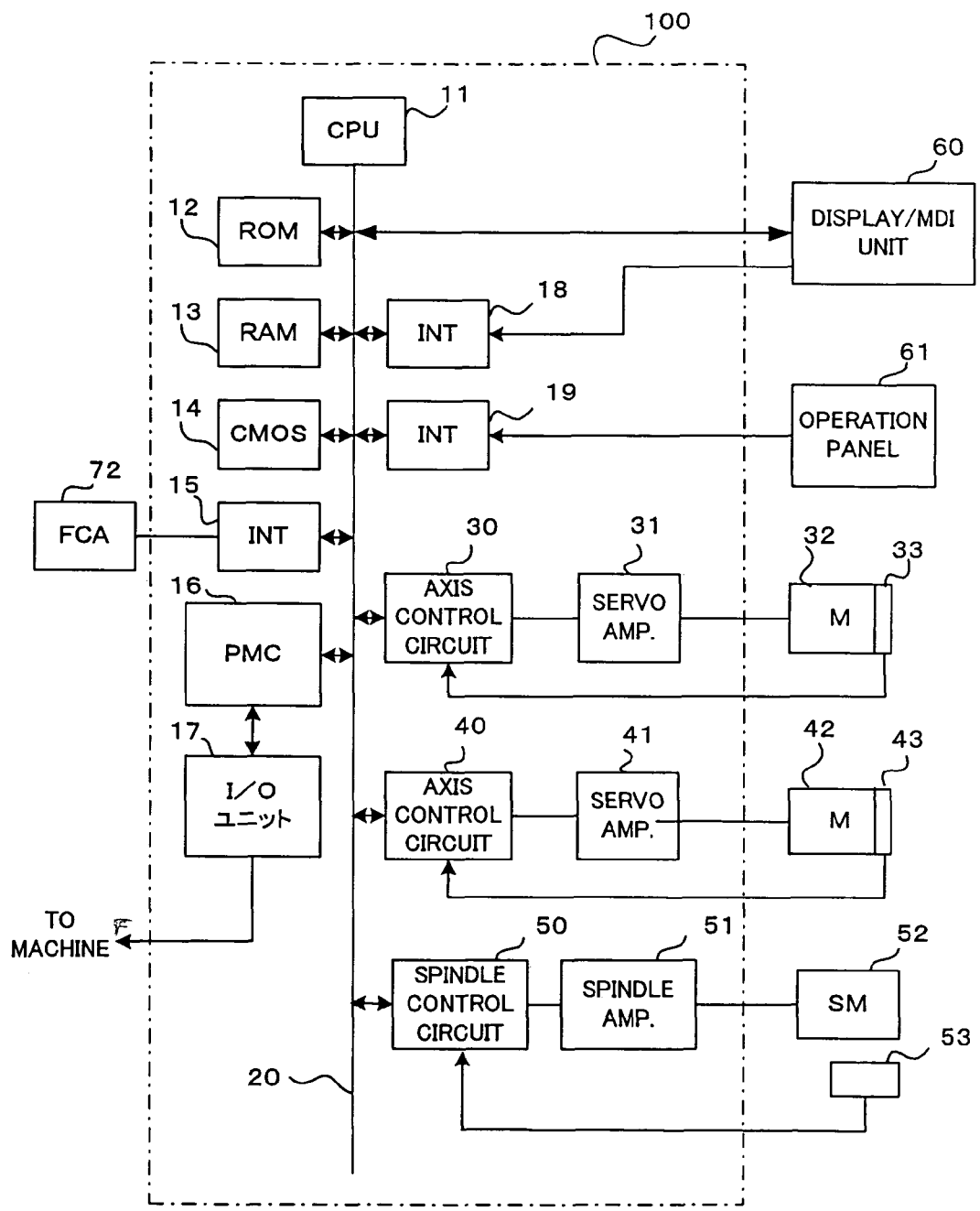
FIG. 1 is a block diagram of a numerical controller according to an embodiment of the present invention.

FIG. 1 shows a numerical controller 100 according to an embodiment of the invention. A processor (CPU) 11 is connected with a ROM 12, a RAM 13, a CMOS memory 14, interfaces 15, 18, 19, axis control circuits 30, 40 and a spindle control circuit 50 through a bus 20. The CPU 11 reads a system program stored in the ROM 12 through the bus 20 and generally controls the numerical controller in accordance with the system program. The RAM 13 stores temporary calculation data, display data and data of various kinds inputted by an operator through a CRT/MDI unit 60. The CMOS memory 14 is a nonvolatile memory backed up by a battery (not shown) to retain stored data even when a power supply to the numerical controller 100 is turned off. Machining programs loaded through the interface 15 or inputted through the CRT/MDI unit 60 are stored in the CMOS memory 14. In accordance with the present invention, data for specifying a position of a tool with respect to rotational angle and rotational speed of a workpiece are inputted and stored in the CMOS memory 14.

The interface 15 connects the numerical controller 100 to an external device 72 such as an adaptor. Machining programs stored in external storage means are read through the external devices 72. A PC (programmable controller) 16 controls auxiliary devices of the machine tool (e.g. actuators of a robot hand for changing tools) by outputting signals to them through an I/O unit 17 in accordance with sequence programs stored in the numerical controller 10.

The CRT/MDI unit 60 is a manual data input unit provided with a display, a keyboard, etc. The interface 18 receives commands and data from the keyboard of the CRT/MDI unit 60 and outputs them to the CPU 11. The interface 19 is connected to an operation panel 61 and receives various commands from the operation panel 61.

In this embodiment, a machine to be controlled by the numerical controller 100 comprises an X-axis and a Z-axis perpendicular to each other for moving a tool relatively to a workpiece, and a spindle to which a workpiece is attached. Axis control circuits 30 and 40 for the X-axis and the Z-axis are respectively connected to servo amplifiers 31 and 41 which are constituted by invertors, and the servo amplifiers 31 and 41 are connected to servomotors 32 and 42, respectively. Position/velocity detectors 33 and 43 are provided at the respective servomotors 32 and 42, and outputs of the position/velocity detectors 33 and 43 are fed back to the axis controllers 30 and 40, respectively.

The axis control circuits 30 and 40 receive motion commands for the respective axes from the processor 11, and position/speed feedback signals from the respective position/speed detectors 33 and 43 and current feedback signals form a current detector (not shown), and perform position, speed and current loop controls to produce PWM signals for the respective axes, and output the signals to the respective servo amplifiers 31 and 41. Upon receipt of those signals, the servo amplifiers 31 and 41 drive the servo motors 32 and 42 for the respective axes. A spindle control circuit 50 receives a spindle rotation command from the processor 11 and a feedback signal from a position coder 53 and performs position and velocity loop controls and controls the position and velocity of a spindle motor 52 through a spindle amplifier 51.

The numerical controller of the present invention can be realized by utilizing the above hardware configuration of the general numerical controller enabling the control of the position/velocity of the spindle.

According to the present invention, the tool is moved relative to the workpiece is controlled in accordance with a rotational position and a rotational velocity of the workpiece by designating data of the rotational position and the rotational velocity of the workpiece, and data of the position of the tool corresponding to the data of the rotational position of the workpiece.

In this embodiment, the workpiece is attached to the spindle and the tool is moved relatively to the workpiece in the direction of the Z-axis parallel to an axis of the spindle and also in the direction of the X-axis perpendicular to the Z-axis. Alternatively, the tool may be moved in the X-axis direction and the spindle with the workpiece attached thereon may be moved in the Z-axis direction to thereby provide relative motions of the tool and the workpiece.

The position of the tool is controlled to be synchronous with the rotational position of the workpiece 1 on the spindle axis as the reference axis by designating values of the rotational position $\theta$ and the rotational velocity V of the workpiece 1 and values of the position (X, Z) of the tool corresponding to the values of the rotational position $\theta$.

Figures 2, 3:
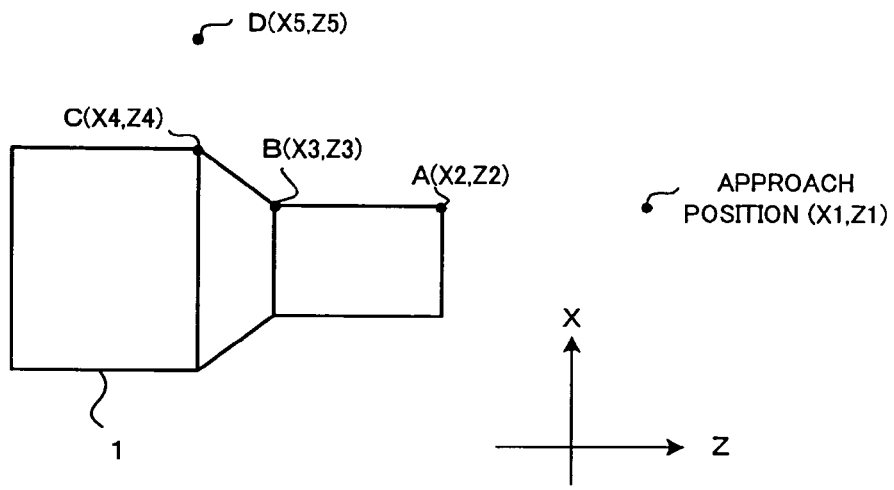
FIG. 2 is a schematic diagram showing an example of a machining operation on a workpiece by rotating the workpiece and moving a tool relatively to the workpiece.
FIG. 3 is a table of designated data for the machining operation.

FIG. 2 schematically shows an example of machining of a workpiece 1 by a tool of a machine controlled by the numerical controller according to the embodiment of the present invention. In this machining, the tool is moved to an approach position $(X_1, Z_1)$ and then successively to a position A $(X_2, X_2)$, a position B $(X_3, Z_3)$, a position C $(X_4, Z_4)$ and a position D $(X_5, Z_5)$ in synchronism with the rotation of the workpiece 1 attached to the spindle.

For the above machining, rotational position $\theta_i (i=0, 1, 2, \ldots, 5)$ of the workpiece 1 (the spindle) at which the rotational velocity of the workpiece 1 is to be changed, positions $(X_1, Z_1)$ of the tool when the workpiece 1 is positioned at the rotational positions $\theta_i$, and rotational velocities $V_i$ of the workpiece 1 from the rotational position $\theta_i$ to the next rotational position $\theta_{i+1}$ at which the rotational velocity is to be changed are set in advance. An example of setting of these data is shown in FIG. 3. In FIG. 3, the set data is denoted by the reference numeral 2, and values of a velocity $Vx_i$ of the X-axis and a velocity $Vz_i$ of the Z-axis obtained by calculation using the set data, as described later, are shown as calculated data 3.

First, the rotational position $\theta_i$ and the rotational velocity Vi of the workpiece 1 attached to the spindle, and the position $(X_1, Z_1)$ of the tool when the workpiece 1 is positioned at the rotational position $\theta_i$ are set through the display/MDI unit 60 and stored in the CMOS memory 14.

In particular, a rotational position $\theta_0$ of the workpiece 1 (e.g. $\theta_0=0$), an X-axis position $X_0$ and a Z-axis position $Z_0$ of the tool corresponding to the rotational position $\theta_0$ of the workpiece 1, and a rotational velocity $V_0$ of the workpiece 1 from the rotational position $\theta_0$ of the tool are set. Then, a rotational position $\theta_1$ (e.g. 21,600 degrees=360 degree×60 turns) of the workpiece 1, an approach position (X1, Z1) of the tool corresponding to the rotational position $\theta_1$ of the workpiece 1, and a rotational velocity $V_1$ of the workpiece 1 from the rotational position $\theta_0$ are set. Similarly, a rotational position $\theta_2$ (e.g. 72,000 degrees=360 degrees×200 turns) of the workpiece 1, the tool position A (X2, Z2) corresponding to the rotational position $\theta_2$, and a rotational velocity V2 of the workpiece 1 from the rotational position $\theta_2$ are set. A rotational position $\theta_3$ (e.g. 108,000 degrees=360 degrees×300 turns) of the workpiece 1, a tool position B $(X_3, Z_3)$ corresponding to the rotational position $\theta_3$, and a rotational velocity $V_3$ of the workpiece 1 from the rotational position $\theta_3$ are set. A rotational position $\theta_4$ (e.g. 216,000 degrees=360 degrees×600 turns) of the workpiece 1, a tool position C $(X_4, Z_4)$ corresponding to the rotational position $\theta_4$, and a rotational velocity $V_4$ of the workpiece 1 from the rotational position $\theta_4$ are set. Then, a rotational position $\theta_5$ (e.g. 288,000 degrees=360 degrees×800 turns) of the workpiece 1, and a position D $(X_5, Z_5)$ corresponding to the rotational position $\theta_5$ are set.

After the rotational positions $\theta_1$–$\theta_5$ of the workpiece 1 at which the rotational velocity of the workpiece 1 is to be changed, the rotational velocities V1–V5 from the respective rotational positions $\theta_1$–$\theta_5$ and the tool positions $(X_1, Z_1)$–$(X_5, Z_5)$ corresponding to the respective rotational positions $\theta_1$–$\theta_5$ of the workpiece 1 are set, a command for executing the machining operation is inputted to operate the numerical controller 100.

Figure 4:
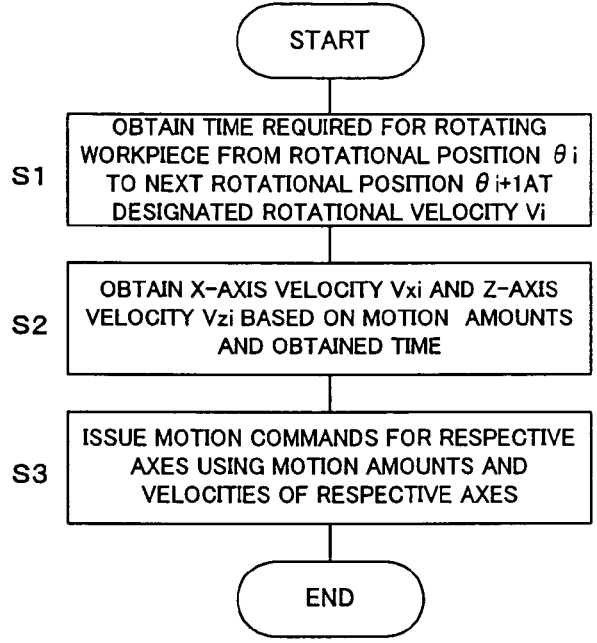
FIG. 4 is a flowchart of processing for performing the machining operation.

FIG. 4 is a flowchart of processing to be executed by the processor 11 of the numerical controller 100. The processing in Steps S1 and S2 is to be performed by the processor 11 as pre-processing before issuing motion commands for respective axes, and the processor 11 reads the set data sequentially according to the index i and obtains velocities of the tool relative to the workpiece 1.

Time $T_i$ required for moving the workpiece 1 from the rotational position $\theta_i$ to the next designated rotational position $\theta_{i+1}$ at the designated rotational velocity $V_i$ is calculated according to the following equation (1) (Step S1).

$$T_i = (\theta_{i+1} - \theta_i)/V_i \qquad (1)$$

Since the X-axis position is to be changed from $X_i$ to $X_{i+1}$ and the Z-axis position is to be changed from $Z_i$ to $Z_{i+1}$ in the time $t_i$, the velocity $Vx_i$ of the X-axis and the velocity $Vz_i$ of the Z-axis are calculated according to the following equations (2) and (3) (Step S2).

$$Vxi = (X_{i+1} - X_i)/T_i \qquad (2)$$

$$Vzi = (Z_{i+1} - Z_i)/T_i \qquad (3)$$

Thus, the X-axis velocity $Vx_i$ and the Z-axis velocity $Vz_i$ of the tool are calculated so that the position of the tool is changed from the position $(X_i, Z_i)$ to the target position $(X_{i+1}, Z_{i+1})$ while the workpiece 1 is rotated from the rotational position $\theta_i$ corresponding to the tool position $(X_i, Z_i)$ to the target rotational position $\theta_{i+1}$ at the rotational velocity $V_i$.

The processor 11 performs the above processing represented by the equations (1)–(3) as the pre-processing to obtain data of $Vx_i$ and $Vz_i$, and issued motion commands for the respective axes based on the obtained data and the set data of $\theta_{i+1}, V_i, X_{i+1}, Z_{i+1}$. In particular, motion commands are distributed to the spindle control circuit 50 such that the workpiece 1 is driven to reach the target rotational position $\theta_{i+1}$ at the rotational velocity $V_i$, motion commands are distributed to the axis control circuit 30 for the X-axis such that the X-axis is driven to reach the target position $X_{i+1}$ at the velocity $Vx_i$, and motion commands are distributed to the axis controller 40 for the Z-axis such that the Z-axis is driven to reach the target position $Z_{i+1}$ at the velocity $Vz_i$ (Step S3). The spindle control circuit 50, the axis control circuits 30, 40 for the X-axis and the Z-axis receive the respective motion commands and perform position and velocity feedback controls using the feedback signals of position and velocity from the position coder 53 and the position/velocity detectors 33, 43, and also current feedback control, so that the spindle motor 52, servomotors 32 and 42 are drivingly controlled through the spindle amplifieer51 and the servo amplifiers 31, 41.

With the above processing, the tool is moved relative to the workpiece in synchronism with the rotary motion of the workpiece 1 to perform the machining operation.

In the foregoing embodiment, the calculation of equations (1)–(3) is performed as the pre-processing by reading the set data in advance of issuing the motion command for the respective axes, so that values of the velocities $Vx_i$ and $Vz_i$ of the X-axis and the Z-axis are obtained. Alternatively, after the setting of data of the rotational position $\theta_i$ and the rotational velocity $V_i$ of the workpiece 1 and data of the tool position $(X_i, Z_i)$ is completed, the calculations according to equations (1)–(3) may be automatically performed to obtain the velocities Vxi and Vzi of the X-axis and the Z-axis, respectively, and the calculated data may be stored with the set data, as shown in FIG. 3. In this case, when carrying out the machining operation, the processor 11 of the numerical controller 100 performs only the processing of Step S3 to distribute the motion commands for the respective axes based on the stored data of the set data of $\theta_i, V_i, X_i, Z_i$ and the calculated data of $Vx_i, Vz_i$.

Figure 5:
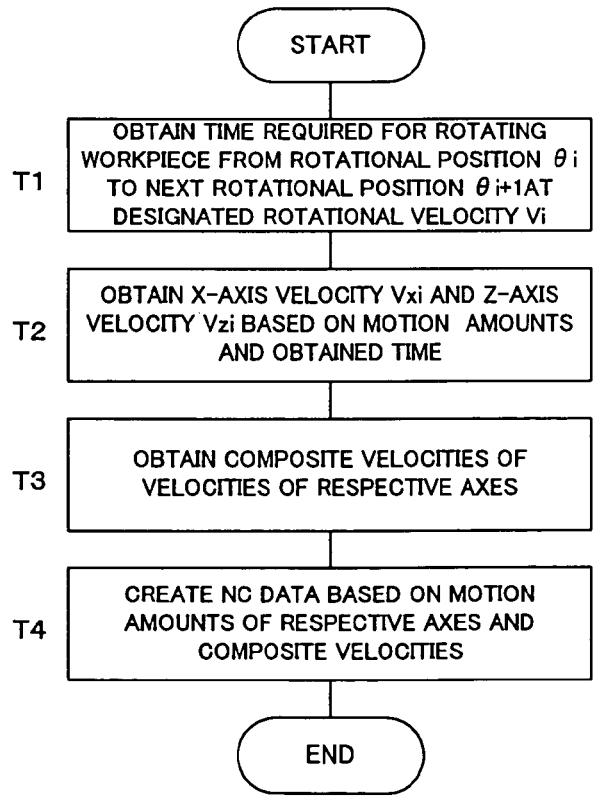
FIG. 5 is a flowchart of processing for creating NC data for performing the machining operation.

FIG. 5 shows processing for creating NC data based on the set data.

Afer the data of the rotational position $\theta_i$ and the rotational velocity $V_i$ of the workpiece, and the position $(X_i, Z_i)$ of the tool corresponding to the rotational position $\theta_i$ of the workpiece are set, when a command for creating the NC data is inputted, the processor 11 of the numerical controller 100 performs processing of Steps T1 and T2 in FIG. 5, which is the same as Steps S1 and S2 in FIG. 4, to obtain the velocities $Vx_i$ and $Vz_i$ of the X-axis and the Z-axis by the calculation of the equations (1)–(3). Then, a composite velocity of the rotational velocity $V_i$ of the workpiece, the velocities $Vx_i, Vz_i$ of the X-axis and the Z-axis is obtained (Step S3), and NC data are based on motion amounts of the spindle (the workpiece), the X-axis and the Z-axis and the composite velocities (Step T4).

In the foregoing embodiment, the tool is driven to move relatively to the workpiece in synchronism with rotation of the workpiece by designating data of position of the tool relative to the workpiece which correspond to the rotational positions of the workpiece. Alternatively, the tool may be rotated and the relative positions of the tool and the workpiece may be controlled in synchronism with the rotation of the tool. For example, a position of a drill, as the tool, in a direction of a tool axis (Z-axis) and a position of the drill in a direction perpendicular to the tool axis (X-axis) relative to the workpiece may be controlled in synchronism with the rotation of the drill.

According to the present invention, relative position of a workpiece and a tool is controlled in synchronism with rotation of a reference axis on which the workpiece or the tool is attached without causing a time delay of controlling of the relative position with respect to the rotational position of the reference axis especially in variation of the rotational velocity thereof. The numerical controller of the present invention can be realized by utilizing hardware configuration of the general numerical controller.

What is claimed is:

1. A numerical controller for controlling a machining operation on a workpiece by a tool by rotating the workpiece and moving the tool relatively to the workpiece, comprising:

designating means for designating data of a rotational position and a rotational velocity of the workpiece, and data of a position of the tool relative to the workpiece corresponding to the data of the rotational position of the workpiece; and computing means for controlling the rotational position and the rotational velocity of the workpiece and the position of the tool relative to the workpiece based on the data designated by said designating means.

2. A numerical controller according to claim 1, wherein said computing means obtains a velocity of motion of the tool relative to the workpiece based on the data of the rotational position and the rotational velocity of the workpiece and the data of the position of the tool relative to the workpiece, and controls the position of the tool relative to the workpiece based on the obtained velocity motion of the tool.

3. A numerical controller according to claim 1, further comprising data input means for inputting the data of the rotational position and the rotational velocity of the workpiece, and the data of the position of the tool relative to the workpiece corresponding to the data of the rotational position of the workpiece.

4. A numerical controller according to claim 1, further comprising storage means for storing the data of the rotational position and the rotational velocity of the workpiece, and the data of the position of the tool relative to the workpiece corresponding to the data of the rotational position of the workpiece.

5. A numerical controller according to claim 4, wherein said computing means creates NC data based on the data stored in said storage means.

6. A numerical controller for controlling a machining operation on a workpiece by a tool by rotating the tool and moving the tool relatively to the workpiece, comprising:

designating means for designating data of a rotational position and a rotational velocity of the workpiece, and data of a position of the tool relative to the workpiece corresponding to the data of the rotational position of the workpiece; and computing means for controlling the rotational position and the rotational velocity of the tool and the position of the tool relative to the workpiece based on the data designated by said designating means.

7. A numerical controller according to claim 6, wherein said computing means obtains a velocity of motion of the tool relative to the workpiece based on the data of the rotational position and the rotational velocity of the tool and the data of the position of the tool relative to the workpiece, and controls the position of the tool relative to the workpiece based on the obtained velocity of motion of the tool.

8. A numerical controller according to claim 6, further comprising data input means for inputting the data of the rotational velocity and the rotational position of the tool, and the data of the position of the tool relative to the workpiece corresponding to the data of the rotational position of the tool.

9. A numerical controller according to claim 6, further comprising storage means for storing the data of the rotational position and the rotational velocity of the tool, and the data of the position of the tool relative to the workpiece corresponding to the data of the rotational position of the tool.

10. A numerical controller according to claim 9, wherein said computing means creates NC data based on the data stored in said storage means.

11. A method for controlling relative motions of a tool and a workpiece in a machining apparatus, comprising:

designating values of a rotational position and a rotational velocity of the workpiece;

designating values of a position of the tool corresponding to the values of the rotational position of the workpiece;

computing the velocity of the motion of the tool relative to the workpiece based on the data of the rotational position, the rotational velocity of the workpiece and the position of the tool; and controlling the position of the tool relative to the workpiece based on the obtained velocity motion of the tool.

12. The method according to claim 11, further comprising inputting the rotational position and the rotational velocity of the workpiece, and the position of the tool relative to the workpiece corresponding to the rotational position of the workpiece.

13. The method according to claim 11, further comprising storing the rotational position and the rotational velocity of the workpiece, and the position of the tool relative to the workpiece corresponding to the rotational position of the workpiece.

14. The method according to claim 11, further comprising inputting the data of the rotational velocity and the rotational position of the tool, and the position of the tool relative to the workpiece corresponding to the rotational position of the tool.

15. The method according to claim 11, further comprising inputting the rotational velocity and the rotational position of the tool, and the position of the tool relative to the workpiece corresponding to the rotational position of the tool.

16. The method according to claim 11, further comprising storing the rotational position and the rotational velocity of the tool, and the position of the tool relative to the workpiece corresponding to the rotational position of the tool.

* * * * *